United States Patent
Kuo

(10) Patent No.: US 6,254,017 B1
(45) Date of Patent: Jul. 3, 2001

(54) STRUCTURE WATER SPRAYER LONG TUBE AND WATER PIPE CONNECTOR

(76) Inventor: Wen-Li Kuo, No.10, Fang Dong Road, Wen Chin Tsun, Fang Yuan Hsiang, Chang Hua Hsien (TW)

( * ) Notice: Subject to any disclaimer, the term of this patent is extended or adjusted under 35 U.S.C. 154(b) by 0 days.

(21) Appl. No.: 09/574,210

(22) Filed: May 19, 2000

(51) Int. Cl.[7] ............................................. B05B 15/06
(52) U.S. Cl. .................. 239/532; 239/581.1; 251/315.15
(58) Field of Search .................................... 239/532, 525, 239/581.1, 582.1; 288/280, 276, 281; 138/44, 45; 251/315.14, 315.15, 315.1, 148

(56) References Cited

U.S. PATENT DOCUMENTS

| | | | |
|---|---|---|---|
| 2,981,284 | * 4/1961 | Putnam | 239/581.1 |
| 4,114,812 | * 9/1978 | Austin et al. | 239/532 |
| 4,206,877 | * 6/1980 | Hoza, III | 239/581.1 |
| 5,976,631 | * 11/1999 | Ramachandran | 239/532 |

* cited by examiner

Primary Examiner—Lisa Ann Douglas
(74) Attorney, Agent, or Firm—Dougherty & Troxell

(57) ABSTRACT

A water sprayer long tube and water pipe connector, having formed along a bottom section internal threads that are followed in respective order from its water inlet end by a first polytetrafluoroethylene water sealing ring, a ball valve, and a second polytetrafluoroethylene water sealing ring for coupling the two components. The opening of the water outlet end is of a smaller inner diameter than that of the opening at the water inlet end and a water sealing ring is ensconced along the inner diameter edge of the water outlet end. A flange formed at the bottom end of the long tube in the water inlet end of the connector is secured and constrained inside the connector, with the constraining of the long tube flange of the water sprayer enabling it to become assembled with the connector into a single structural entity that cannot be disconnected. Thus, after the water sprayer bottom end is assembled to the connector and when the connector bottom end is assembled to the water pipe connector, in addition to allowing the user to easily adjust the angle of the water sprayer, the separation and loss of the entire connector from the long tube of the water sprayer is effectively prevented.

2 Claims, 5 Drawing Sheets

STRUCTURE WATER SPRAYER LONG TUBE AND WATER PIPE CONNECTOR

BACKGROUND OF THE INVENTION

1. Field of the Invention

The invention herein relates to an improved structure water sprayer long tube and water pipe connector that improves upon the easy misplacement drawbacks of the conventional water sprayer long tube and connector conjoinment structures and the lack of a simple water sprayer angle adjustment capability. The invention herein provides for the effective improvement of the conventional shortcomings included among the innovative features of the present invention.

2. Description of the Prior Art

Conventional water sprayers, as indicated in FIG. 1, FIG. 2, and FIG. 3, are comprised of a sprayer head 2 having a numerous fine water output holes in a patterned arrangement and a long tube 3 conjoined to the bottom end of the sprayer head 2, enabling the bottom end of the long tube 3 of the sprayer head 2 to be coupled to the high pressure water flow of a water pipe connector (a conventional structure not shown in the drawings) and thereby providing a structure for the stoppage and control of the water flow. A sleeve 4 is disposed between a connector 5 and the water pipe connector to serve as the switching control of the connector 5 as well as a conjoinment structure. Threads 41 are formed along the interior section of the sleeve 4 and at its top end is the inward lip 421 of an insertion hole 42 which provides for insertion of the bottom end of the water sprayer long tube 3. Also formed at the bottom end of the water sprayer long tube 3 is a flange 31, such that when the said flange 31 is constricted by the inward extending lip 421 at the top end of sleeve 4, separation from the top end of the sleeve is precluded. A water sealing ring 43 is ensconced in the interior section of the sleeve 4. Serving as a switchable component, the connector 5 is equipped at the approximate center of its interior section with a partition plate 51 with a water output hole 511 formed in the center of the partition plate 51. Installed from its bottom end is a water stoppage and controlling ball valve 52 and a water sealing ring 53. External threads 54 are formed along its outer top end providing for fastening to the threads 41 formed along the interior section of the sleeve 4, and internal threads 55 are formed along its interior bottom section to enable coupling to the water pipe connector (not shown in the drawings). Given the assembly of the structure, when the entire water sprayer is to be coupled to the high pressure water flow of the water pipe, the water pipe connector only has to be directly fastened to the internal threads 55 formed along its interior bottom section of the connector S to achieve effective coupling.

However, a major shortcoming of this type of structural assembly that provides for the coupling of the long tube 3 of the water sprayer to the water pipe connector is that, since the external reads 54 at the upper section and exterior of the connector 5 are fastened to the sleeve 4, and the connector 5 and the sleeve 4 are two components, connector 5 is easily disconnected and misplaced. Second, the water sprayer angle of the entire coupled water pipe connector is at a set angle which is not necessarily the grasping angle preferred by the user, resulting in inconvenience during actual sprayer utilization, a shortcoming that awaits improvement.

Therefore, in view of the existent said shortcomings of the conventional structure that await improvement, the inventor of the invention, based on years of experience gained from engagement in various water application, landscaping, and other related hardware marketing, production, and assembly as well as after-sales feedback from consumers, conducted extensive research informed by the said factors that culminated in the development of the present invention.

SUMMARY OF THE INVENTION

The primary objective of the present invention is to provide an improved structure of a water sprayer long tube and water connector, specifically referring to the arrangement between the long tube and the water pipe connector of the water sprayer, wherein directly disposed from the water inlet end in respective order are a polytetrafluoroethylene water sealing ring, a ball valve that opens or closes the path of water flow, and another polytetrafluoroethylene water sealing ring that couple the said two components together. The opening of the water outlet end is of a smaller inner diameter than that of the opening at the water inlet end, and a water sealing ring is ensconced along the inner diameter edge of the said water outlet end. After the long tube is installed into the inner diameter of the water outlet end, a flange formed at the bottom end of the long tube in the water inlet end of the connector is secured and constrained inside the connector, with the constraining of the long tube flange of the water sprayer enabling it to become assembled with the connector into a single structural entity that cannot be disconnected. After the water sprayer bottom end is first assembled to the connector and when the connector bottom end is assembled to the water pipe connector for utilization, in addition to allowing the user to easily adjust the angle of the water sprayer as desired, the separation and loss of the entire connector from the long tube of the water sprayer is effectively prevented, which is among the innovative features of the invention herein.

Another objective of the invention herein is to provide an improved structure of a water sprayer long tube and water pipe connector that provides for a connector between the long tube of the water sprayer and the water pipe connector. After the long tube of the water sprayer is inserted into the opening of the water outlet end, an outwardly extending flange formed at its bottom end, constrains it at the interior section. Following which a polytetrafluoroethylene water sealing ring, a ball valve that controls water by opening closing of the path of flow, and another polytetrafluoroethylene water sealing ring are respectively installed in the water inlet end to assemble the connector structure. Given that the water sealing washers ensconced inside the opening of the water outlet end and, furthermore, the friction-resistance of polytetrafluoroethylene, when the interior bottom section of the connector is fastened to the water pipe connector, the long tube of the said water sprayer can as a result be easily adjusted to a desired utilization angle to facilitate the spraying operation, which is among the innovative features of the invention herein.

To further understand the structure, innovative features, and operation of the invention herein for purposes of review and reference, the brief description of the drawings below is followed by the detailed description of the invention.

DETAILED DESCRIPTION OF THE INVENTION

Figure 1:
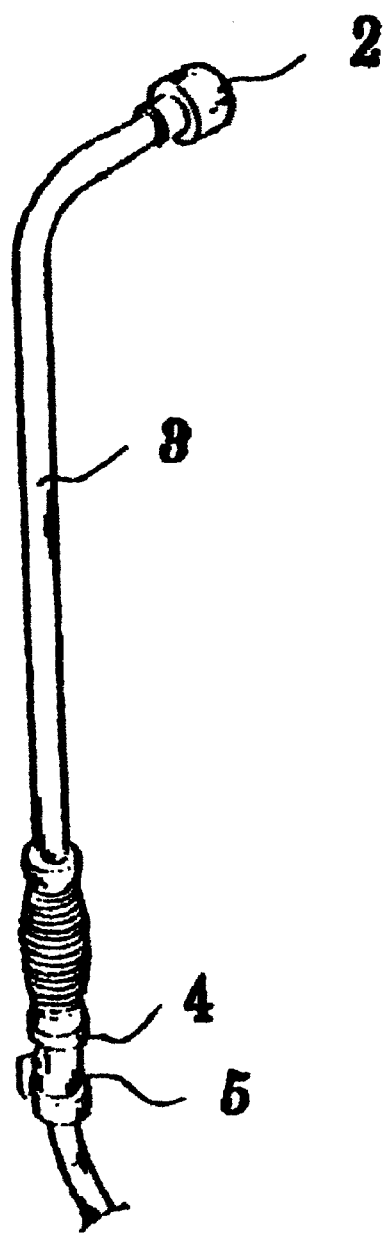
FIG. 1 is an isometric drawing of a conventional water sprayer as assembled to the sleeve and the connector.
Figure 2:
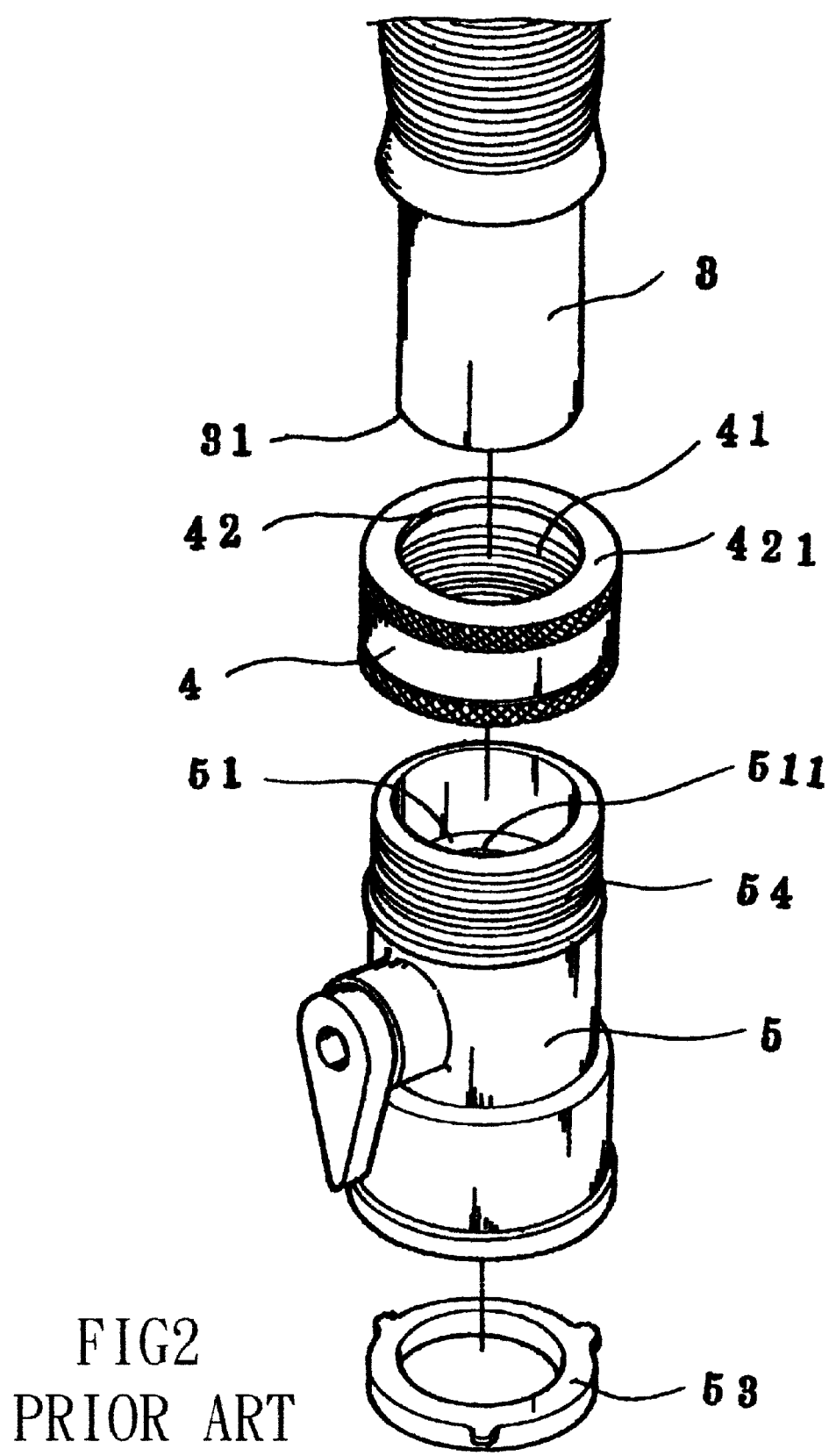
FIG. 2 is an exploded drawing of the long tube, and connector of a conventional water sprayer.
Figure 3:
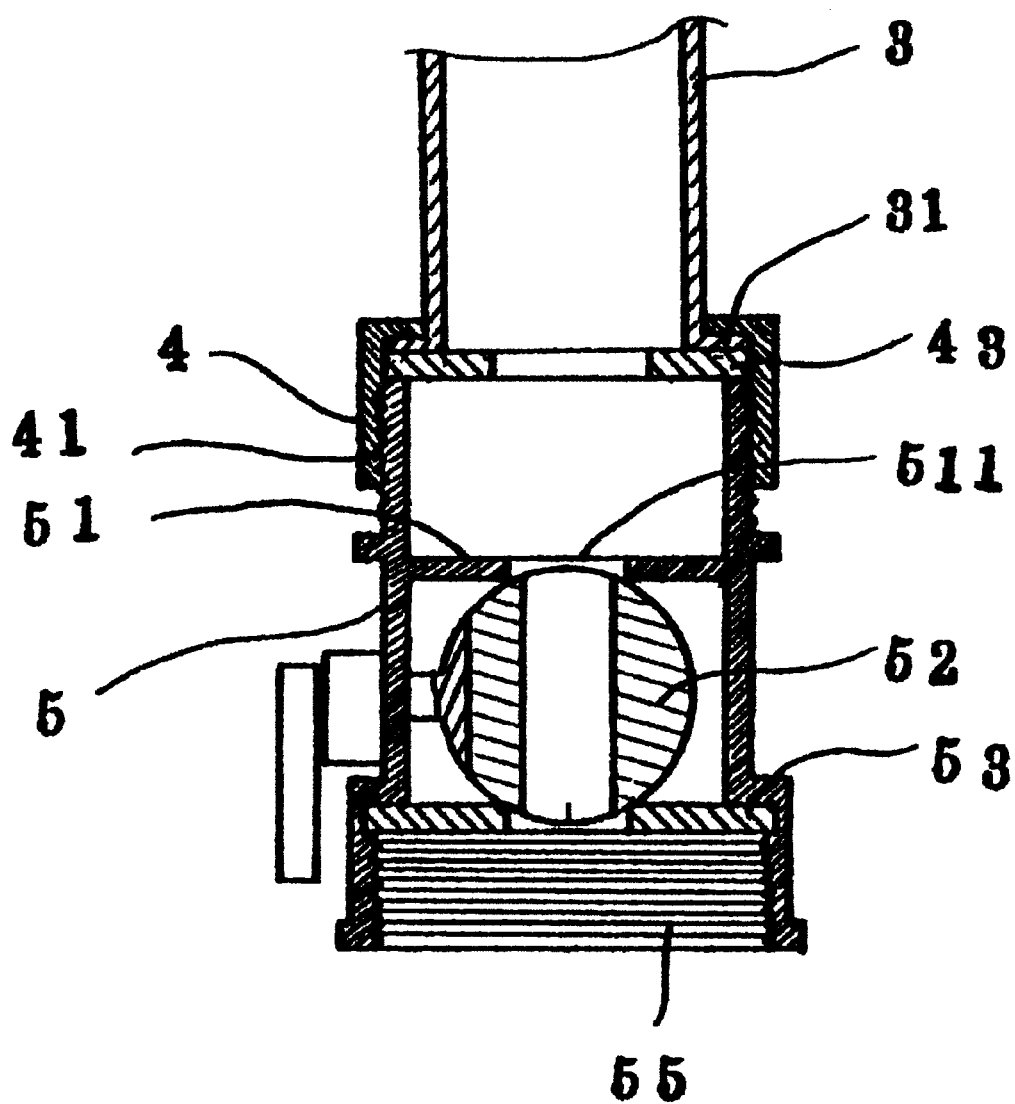
FIG. 3 is a cross-sectional drawing of the long tube, sleeve, and connector of a conventional water sprayer.
Figure 4:
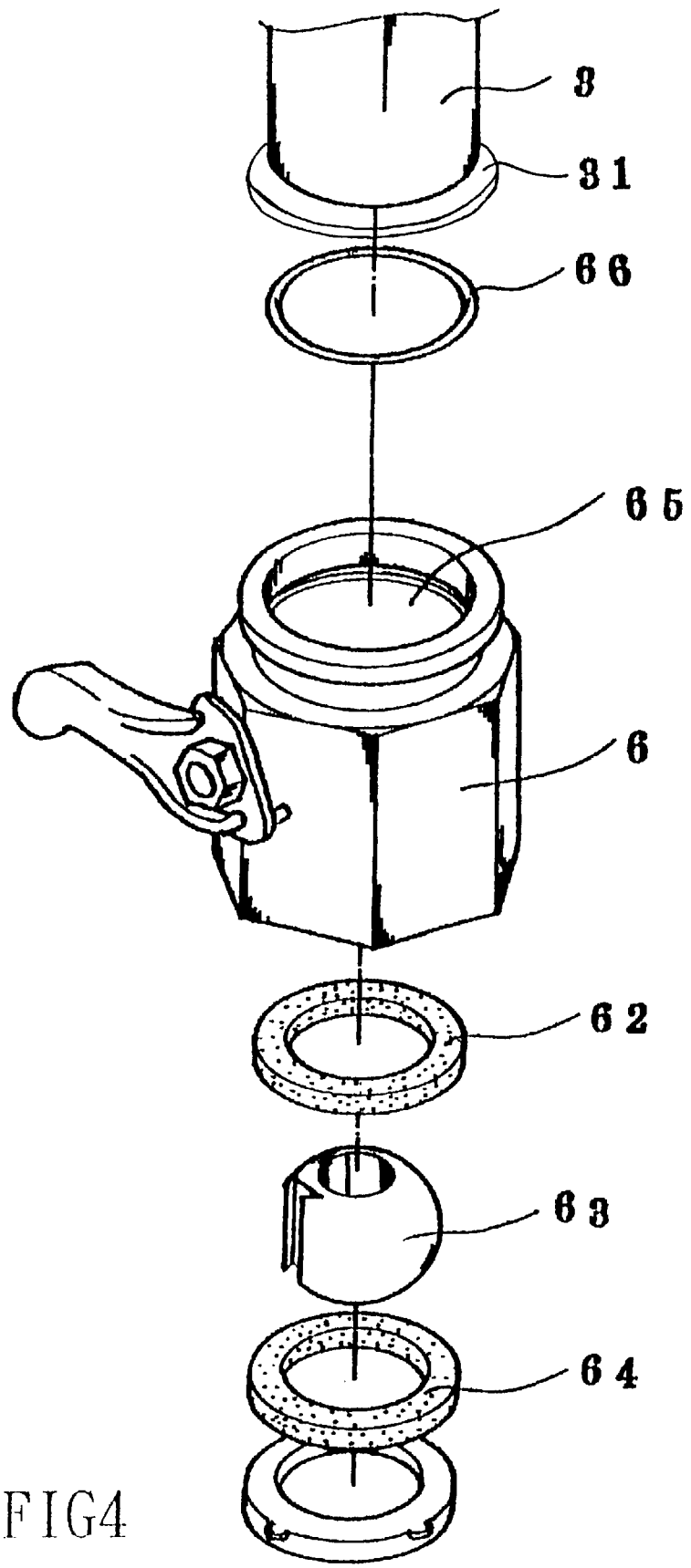
FIG. 4 is an exploded drawing of the structural details between the long tube and the connector of the water sprayer invention herein.
Figure 5:
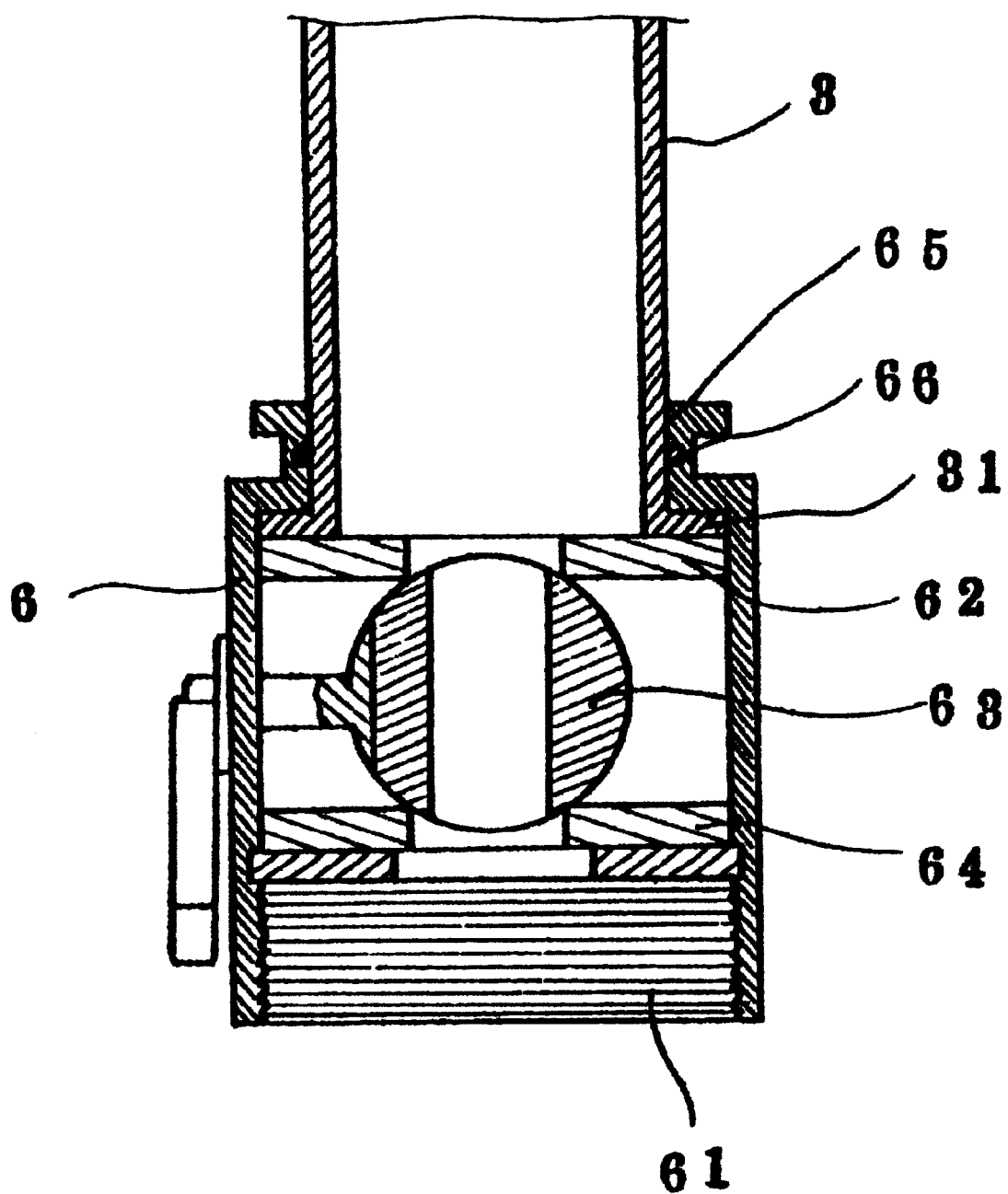
FIG. 5 is a cross-sectional drawing of the structural details between the long tube and the connector of the water sprayer invention herein.

Referring to FIG. 4 and FIG. 5, the structure of the conjoined long tube 3 and water pipe connector of the invention herein consists of a connector 6 having internal threads 61 at the bottom section of its water inlet end followed in respective order by a first polytetrafluoroethylene water sealing ring 62, a ball valve 63 that opens or closes the path of water flow, and a second polytetrafluoroethylene water sealing ring 64 that couple the said two components together. The opening of the water outlet end 65 is of a smaller inner diameter than that of the opening at the water inlet end. A water sealing ring 66 is ensconced along the inner diameter edge of the said water outlet end 65. After the long tube 3 is installed into the inner diameter of the water outlet end 65, a flange 31 at the bottom end of the long tube 3 in the water inlet end of the connector 6 is secured and constrained inside the connector 6, with the constraining of the long tube 3 flange 31 of the water sprayer enabling it to become assembled with the connector 4 into a single structural entity that cannot be disconnected. After the water sprayer bottom end is first assembled to the connector 6 and when the connector 6 bottom end is assembled to the water pipe connector for utilization, in addition to allowing the user to easily adjust the desired angle of the water sprayer, the separation and loss of the entire connector 6 from the long tube 3 of the water sprayer is prevented, thereby effectively enhancing the practicality of the present invention.

In summation of the foregoing section, the invention herein is simpler and more advantageous than the conventional structure.

What is claimed is:

1. A water sprayer comprising:

a) an elongated tube having a water spray head on a first end and an outwardly extending flange on a second end;

b) a connector having an inlet opening and an outlet opening wherein the outlet opening has a diameter smaller than a diameter of the inlet opening, the elongated tube passing through the outlet opening such that the outwardly extending flange contacts a portion of the connector so as to prevent removal of the connector from the elongated tube, the inlet opening of the connector having a threaded portion for connection to a water pipe;

c) first and second spaced apart, water sealing rings located within the connector; and, d) a ball valve located between the first and second water sealing rings, the ball valve being movable so as to control water flow through the connector.

2. The water sprayer of claim 1 wherein the first and second water sealing rings are made of polytetrafluoroethylene material.

* * * * *

(12) EX PARTE REEXAMINATION CERTIFICATE (5493rd)
United States Patent
Kuo

(10) Number: US 6,254,017 C1
(45) Certificate Issued: Sep. 5, 2006

(54) STRUCTURE WATER SPRAYER LONG TUBE AND WATER PIPE CONNECTOR

(75) Inventor: Wen-Li Kuo, No.10, Fang Dong Road, Wen Chin Tsun, Fang Yuan Hsiang, Chang Hua Hsien (TW)

(73) Assignee: Wen-Li Kuo, Chang Hua Hsien (TW)

Reexamination Request:
No. 90/006,169, Dec. 31, 2001

Reexamination Certificate for:
Patent No.: 6,254,017
Issued: Jul. 3, 2001
Appl. No.: 09/574,210
Filed: May 19, 2000

(51) Int. Cl.
*B05B 15/06* (2006.01)

(52) U.S. Cl. ............... 239/532; 239/581.1; 251/315.15
(58) Field of Classification Search ................ None
See application file for complete search history.

(56) References Cited

U.S. PATENT DOCUMENTS 5,566,708 A 10/1996 Hobbs, Jr.
5,992,823 A 11/1999 Hung-Lin

*Primary Examiner*—Davis Hwu

(57) ABSTRACT

A water sprayer long tube and water pipe connector, having formed along a bottom section internal threads that are followed in respective order from its water inlet end by a first polytetrafluoroethylene water sealing ring, a ball valve, and a second polytetrafluoroethylene water sealing ring for coupling the two components. The opening of the water outlet end is of a smaller inner diameter than that of the opening at the water inlet end and a water sealing ring is ensconced along the inner diameter edge of the water outlet end. A flange formed at the bottom end of the long tube in the water inlet end of the connector is secured and constrained inside the connector, with the constraining of the long tube flange of the water sprayer enabling it to become assembled with the connector into a single structural entity that cannot be disconnected. Thus, after the water sprayer bottom end is assembled to the connector and when the connector bottom end is assembled to the water pipe connector, in addition to allowing the user to easily adjust the angle of the water sprayer, the separation and loss of the entire connector from the long tube of the water sprayer is effectively prevented.

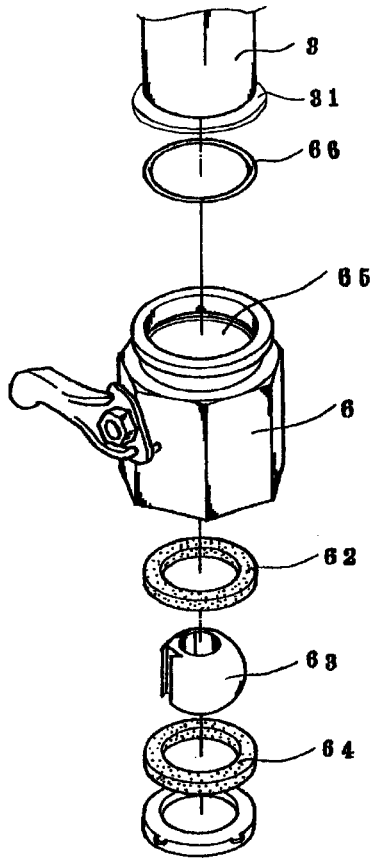

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 2 are cancelled.

* * * * *